US012568992B2

(12) United States Patent

Kumar et al.

(10) Patent No.: US 12,568,992 B2

(45) Date of Patent: *\*Mar. 10, 2026*

(54) METHODS OF USING A NOVEL ANIMAL FEED

(71) Applicant: Louis Dreyfus Company Plant Proteins LLC, Livermore, CA (US)

(72) Inventors: Manoj Kumar, Livermore, CA (US); Prasanth Kumar Sasidharan Pillai, Livermore, CA (US)

(73) Assignee: Louis Dreyfus Company Plant Proteins LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/801,163

(22) Filed: Aug. 12, 2024

(65) Prior Publication Data

US 2025/0295142 A1 Sep. 25, 2025

Related U.S. Application Data

(63) Continuation of application No. 18/744,499, filed on Jun. 14, 2024, which is a continuation of application No. 18/614,211, filed on Mar. 22, 2024.

(51) Int. Cl.
*A23K 10/30* (2016.01)
*A23K 50/10* (2016.01)

(52) U.S. Cl.
CPC .............. *A23K 10/30* (2016.05); *A23K 50/10* (2016.05)

(58) Field of Classification Search
CPC ................................. A23K 10/30; A23K 50/10
USPC ........................................................... 426/2
See application file for complete search history.

(56) References Cited

U.S. PATENT DOCUMENTS

| | | | | |
|---|---|---|---|---|
| 3,991,218 | A | * | 11/1976 | Earle ..................... A23P 20/105 |
| | | | | 426/305 |
| 4,349,578 | A | | 9/1982 | Wright et al. |
| 2021/0274809 | A1 | | 9/2021 | Kraayenbrink et al. |
| 2022/0015387 | A1 | | 1/2022 | Zhang et al. |
| 2022/0071234 | A1 | | 3/2022 | Delporte et al. |

FOREIGN PATENT DOCUMENTS

| | | |
|---|---|---|
| CA | 2757067 A1 | 9/2010 |
| CN | 104857125 A | 8/2015 |
| CN | 106036085 A | 10/2016 |
| CN | 109170260 A | 1/2019 |
| CN | 111280128 A | 6/2020 |
| ES | 2663790 T3 | 4/2018 |
| JP | H06998690 A * | 4/1994 |
| KR | 2005075523 A | 7/2005 |
| KR | 2020016044 A | 2/2020 |
| RU | 2398444 C2 | 9/2010 |
| WO | WO 2000-036928 A1 | 6/2000 |

OTHER PUBLICATIONS

Elliott et al. (in AU 2007200743 A1 (Machine Translation is attached as NPL document). (Year: 2007).*

Anonymous; "What's so special about yellow pea fiber?"; bellycrush; retrieved on Aug. 5, 2024, pp. 1-5 (Sep. 26, 2019).

Bonnardeaux, et al.; "Uses for canola meal"; Department of Primary Industries and Regional Development, Western Australia, Perth. Report, pp. 1-16 (Jan. 2007).

Cotta, et al.; "Effect of Peptides and Amino Acids on Efficiency of Rumen Bacterial Protein Synthesis in Continuous Culture"; Journal of Dairy Science; vol. 65, No. 2, pp. 226-234 (Feb. 1982).

Gilbery, et al.; "Effect of field peas, chickpeas, and lentils on rumen fermentation, digestion, microbial protein synthesis, and feedlot performance in receiving diets for beef cattle"; Journal of Animal Science; vol. 85, No. 11, pp. 3045-3053 (Nov. 2007).

Google Search; "Canola meal"; google; retrieved on Aug. 5, 2024, pp. 1-2 (2024).

Hall, et al.; "Nutrient synchrony: Sound in theory, elusive in practice"; Journal of Animal Science; vol. 86, No. suppl_14, pp. E287-E292 (Apr. 2008).

Joy, et al.; "Effect of dietary lipid inclusion from by-product-based pellets on dry matter intake, ruminal fermentation, and nutrient digestion in finishing beef heifers"; Canadian Journal of Animal Science; vol. 101, No. 3, pp. 481-492 (Sep. 2021).

Nair, et al.; "Evaluation of canola meal derived from *Brassica juncea* and *Brassica napus* on rumen fermentation and nutrient digestibility by feedlot heifers fed finishing diets"; Canadian Journal of Animal Science; vol. 96, No. 3, pp. 342-353 (Sep. 2016).

Nair, et al.; "Evaluation of canola meal derived from *Brassica juncea* and *Brassica napus* seed as an energy source for feedlot steers"; Canadian Journal of Animal Science; vol. 95, No. 4, pp. 599-607 (Dec. 2015).

Zhang, et al.; "Quantifying Nutrient Budgets for Sustainable Nutrient Management"; Global Biogeochemical Cycles; vol. 34, No. 3, e2018GB006060, pp. 1-25 (Mar. 2020).

Bien et al.; Abstract—J. Animal Sci 101 (Suppl. 3) pp. 366-367 (Year: 2023).

Cangiago et al., "Invited Review: Strategic use of microbial-based probiotics and prebiotics in dairy calf rearing", Applied Animal Science 36:630-651 (2020).

Heuze et al., Soybean meal, Feedipedia, a programme by INRAE, CIRAD, AFZ and FAO, Mar. 4, 2020 [Retrieved on Apr. 24, 2025]. <URL: https://feedipedia.org/node/674>.

* cited by examiner

*Primary Examiner* — Erik Kashnikow
*Assistant Examiner* — Bhaskar Mukhopadhyay
(74) *Attorney, Agent, or Firm* — Edward J. Baba; Andrew R. Guzman; Bozicevic, Field & Francis LLP

(57) ABSTRACT

The present invention provides methods of enhancing meat quality obtained from an animal by administering to the animal an improved animal feed comprising an additive mixed with the animal feed. The animal feed comprises an animal feed additive comprising pea solubles, in particular pea solubles added to canola meal.

10 Claims, No Drawings

METHODS OF USING A NOVEL ANIMAL FEED

BACKGROUND OF THE INVENTION

Meat is an important source of nutrition for many people around the world. Global demand for meat has been growing over the past 50 years; meat production has more than tripled in this time. The world now produces more than 350 million tons of meat each year. The United States stands as the largest producer of beef and buffalo meat, and the metrics that decide the sale of meat are based on the quality of the meat. Methods of rearing cattle, farming practices, and post slaughter treatment regimen are the methods that have been researched for improving the meat quality. There is a dearth of natural options for enhancing the meat quality and the need therefore exists for a natural, efficient, reproducible method of improving meat quality.

Pulse grains, including peas, have been reported to improve growth and production performance when added to the diets of sheep and dairy and beef cattle. Pea protein is a popular plant protein source for the food industry. The processing of peas for protein production results in a byproduct of solubles after precipitation of protein in the protein isolation process. When concentrated (often referred to as pea molasses), this soluble byproduct has found industrial applications as a binder. However, utilization in the animal feed industry has not been tested.

Canola meal is a major product in the processing of canola for oil. Canola meal has been utilized as a feed component for livestock and, as an additive to feed preparations, has been reported to improve has been reported to improve the nutrient utilization and growth performance of beef cattle. However, canola meal has been shown to have a lower energy value than cereal grain such as barley. Thus, there is a need to improve the nutritional utilization of canola meal, an abundant and relatively cheap food source, particularly in livestock feed.

SUMMARY OF THE INVENTION

The present invention provides an animal feed additive comprising pea solubles, in particular pea solubles added to canola meal for enhancement of meat quality in livestock. The inventors have shown the surprising result of increased prime-quality meat and preferred marbling in livestock without changing the growth performance. In some embodiments, the present invention discloses the feed additive comprising at least 95% of the portion of canola meal and at least 1% of the portion of pea solubles. Methods of enhancing meat quality obtained from an animal by administering to the animal an improved animal feed comprising an additive mixed with the animal feed are also provided. The meat quality is measured by meat grading parameters including Longissimus thoracic area, proportion of prime quality meat, marbling of the meat, or a combination thereof. The present invention also provides a method of increasing marbling of meat of a ruminant animal, the method comprising at least a portion of canola meal and a portion of pea solubles. The present invention also provides a method of increasing the Longissimus thoracic area of a ruminant animal, the method comprising feeding the ruminant a feed comprising at least a portion of canola meal and a portion of pea solubles. The present invention also provides a method of lowering grade fat thickness of a ruminant animal, the method comprising feeding the ruminant a feed comprising at least a portion of canola meal and a portion of pea solubles. Further, the present invention also provides a method of increasing the proportion of prime quality meat from a ruminant animal, the method comprising feeding the ruminant a feed comprising at least a portion of canola meal and a portion of pea solubles.

DETAILED DESCRIPTION OF THE INVENTION

Compositions are provided for use as an animal feed additive, comprising at least a portion of canola meal and a portion of pea solubles, wherein the portion of canola meal comprises at least 95% of canola meal and the portion of pea solubles comprises at least 1% of pea solubles. The inventors surprisingly found that the animal feed additives, as disclosed herein, have a great potential for enhancing the meat quality of the animal being fed the animal feed additive. The meat quality is enhanced by improving the marbling of meat, increasing the Longissimus thoracic area, increasing the proportion of prime quality of meat or a combination thereof.

Before the present composition and methods of its uses are described, it is to be understood that this invention is not limited to the particular methods or compositions described, which may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

The term "about", particularly in reference to a given quantity, is meant to encompass deviations of plus or minus five percent.

"Extracting" or "extraction" means the removal or separation of one or more component(s) of a multicomponent composition. The concept of extracting a protein isolate from a seed protein flour is well known in the present art.

"Effective amount" means a dosage sufficient to produce a desired result, e.g., an amount sufficient to effect beneficial or desired results, such as enhancing the meat quality as compared to a control.

"Meat" refers to animal flesh that is consumed by humans as food.

Production of Canola Meal from Canola Seed

Production of canola meal is well known in the art. For the examples provided herein, the canola oil seed was processed using solvent extraction to separate the oil from the meal. The cleaned oil seed, after seed preconditioning and flaking, was pressed at high temperature to mechanically remove a portion of the oil, then the cake was further extracted with hexane to remove the reminder of the oil. The deoiled cake was desolventized, toasted, dried, and cooled to produce the canola meal.

Extracting Pea Solubles

Milled pea flour was treated at alkaline conditions to solubilize the protein fraction, which was further separated into protein rich supernatant and starch rich pellet via solid-liquid separation method. The protein rich supernatant (obtained in the previous step) was further purified by isoelectric precipitation and separated via solid-liquid separation method to yield a protein rich pellet (PPI) and protein light supernatant ("pea solubles"). The pea solubles (<5% solids) was concentrated by filtration and/or evaporation to achieve a minimum solid content of 45%. This concentrated pea soluble is used to blend with canola meal. The concentrated pea solubles may also be referred to as pea molasses.

Methods of Enhancing Meat Quality

Aspects, including embodiments, of the present disclosure disclose a composition comprising at least a portion of canola meal and a portion of pea solubles fed to the animal. In some embodiments, the meat quality of the animal administered the composition as disclosed in the present disclosure is enhanced.

For purposes of this present disclosure, the composition comprises canola meal and pea solubles as the active ingredients for purposes of use as a feed additive for animals, particularly, ruminating animals.

For the realization of their use as such ingredients for the feed of ruminants the compounds (canola meal and pea solubles) may be incorporated in the feed by methods known per se in the art of feed formulation and processing.

Presented herein are, in one aspect, is an animal feed additive for use in enhancing meat quality. Animal feed additive is understood to be a composition that is co-fed or admixed with animal feed. The animal feed additive comprises pea protein solubles, in particular in combination with canola meal. The animal feed additive comprises as little as 0.1% pea solubles on a dry basis, but may comprise at least 1% pea solubles, 0.15% pea solubles, 0.2%, 0.3%, 0.4% or 0.5% pea solubles. In other embodiments the animal feed additive comprises at least 0.6%, 0.7%, 0.8%, 0.9% or 1% pea solubles, In other embodiments, the animal feed additive comprises at least 1.5%, 2%, 2.5%, 3%, 3.5%, 4%, 4.5%, 5%, 5.5%, 6%, 6.5%, 7%, 7.5%, 8%, 8.5%, 9% or 9.5% pea solubles. In yet other embodiments, the animal feed additive comprises at least 10% pea solubles.

In certain aspects of the invention, an animal feed additive comprises pea solubles and canola meal. The animal feed additive comprises as much as 98% canola meal. In other embodiments, the animal feed additive comprises at least 97%, 96%, 95%, 94%, 93%, 92%, 91% or 90% canola meal. In other embodiments, the animal feed additive comprises at least 89%, 88%, 87%, 86%, 85%, 84% 83%, 82% 81% or 80% canola meal. In yet other embodiments, the animal feed additive comprises at least 79%, 78%, 77%, 76%, 75%, 74%, 73%, 72% 71% or 70% canola meal.

The following are non-exclusive lists of examples of these further components of the feed of the animal:

Fat soluble vitamins—examples of fat-soluble vitamins are vitamin A, vitamin D3, vitamin E, and vitamin K, e.g. vitamin K3.

Water soluble vitamins—examples of water-soluble vitamins are vitamin B12, biotin and choline, vitamin B1, vitamin B2, vitamin B6, niacin, folic acid and panthothenate, e.g., Ca-D-panthothenate.

Trace minerals—examples of trace minerals are manganese, zinc, iron, copper, iodine, selenium, and cobalt.

Macro minerals—examples of macro minerals are calcium, phosphorus and sodium.

In some embodiments, the animal is a ruminating animal. Ruminating mammals according to the present invention include cattle, goats, sheep, giraffes, American Bison, European bison, yaks, water buffalo, deer, camels, alpacas, llamas, wildebeest, antelope, pronghorn, donkey, elephant and nilgai. For some embodiments of the present invention, domestic cattle, sheep and goat are the preferred species. In some embodiments, steers and heifers are the ruminating animals.

As for feed composition for ruminating animals, such as cows, the ruminating diet is usually composed of an easily degradable fraction (named concentrate) and a fiber-rich less readily degradable fraction (named hay, forage, or roughage).

Hay is made of dried grass, legumes, or other herbaceous plants that have been cut and dried for ruminant feed. Grasses include among others timothy, ryegrasses, fescues. Legumes include among others clover, lucerne or alfalfa, peas, beans and vetches. Other forage crops include sugarcane, kales, rapes, and cabbages. Also root crops such as turnips, swedes, mangles, fodder beet, and sugar beet (including sugar beet pulp and beet molasses) are used to feed ruminants. Still further crops are tubers such as potatoes, cassava and sweet potato. Silage is an ensiled version of the fiber-rich fraction (e.g., from grasses, legumes or whole cereals) whereby material with a high-water content is treated with a controlled anaerobic fermentation process (naturally fermented or additive treated).

Concentrate is largely made up of cereals (such as barley including brewers grain and distillers grain, maize, wheat, sorghum), but also often contain protein-rich feed ingredients such as soybean, rapeseed, palm kernel, cotton seed and sunflower.

In some embodiments of the invention, animal feed comprising the animal feed additives described above for use in enhancing meat quality are provided. In certain embodiments, the animal feed additive is 10% of the animal feed comprising animal feed additive. In other embodiments, the animal feed additive is at least 1%, 20%, 3%, 4%, 5%, 6%, 7%, 8% or 9% of the animal feed comprising animal feed additive. In other embodiments, the animal feed additive is at least 11%, 12%, 13%, 14%, 15%, 16%, 17%, 18%, 19% or 20% of the animal feed comprising animal feed additive.

As for the meat quality, the quality of the obtained meat is measured by meat grading parameters as established by United States Department of Agriculture (USDA). By meat, for purposes of the present disclosure, is meant the meat obtained from livestock like poultry, cattle, pigs, sheep and goats.

Under the current standards established by the United States Department of Agriculture (USDA), meat from cattle, especially, cows and buffaloes, referred to as "beef", is classified into eight different quality grades. Beginning with the highest and continuing to the lowest, the eight quality grades are prime, choice, select, standard, commercial, utility, cutter and canner. The characteristics which are used to classify beef include age, color, texture, firmness, and marbling, a term which is used to describe the relative amount of intramuscular fat of the beef. Well-marbled beef from cattle like bulls, steers, and heifers, i.e., beef that contains substantial amounts of intramuscular fat relative to muscle, tends to be classified as prime or choice; whereas, beef that is not marbled tends to be classified as select. Beef of a higher quality grade is typically sold at higher prices than a lower grade beef. For example, beef that is classified as "prime" or "choice," typically, is sold at higher prices than beef that is classified into the lower quality grades.

Classification of beef into different quality grades occurs at the packing facility and involves visual inspection of the ribeye (the longissimus dorsi) on a beef carcass that has been cut between the 12th and 13th rib prior to grading. However, the visual appraisal of a beef carcass cannot occur until the animal is harvested.

The methods in the present disclosure provide a method of ensuring that the quality of the meat obtained from an animal which has been fed the animal feed additive, as disclosed in this application, is of higher quality standards, such as prime quality, as compared with similar animals not given feed with the feed additive of the invention. In one embodiment, the present disclosure, discloses a method of increasing the amount of prime quality meat derived from the animal by at least 15% of the total derived meat, wherein the animal has been fed a feed additive composition comprising at least a portion of pea protein solubles, in particular pea solubles added to canola meal. In one embodiment, the present disclosure, discloses a method of increasing the amount of prime quality meat derived from the animal by least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%. In some preferred embodiments, the marbling of the meat derived from an animal is increased by at least 15% when the animal is fed the animal feed additive composition mixed with the animal feed for a typical growth period for commercial background and finishing of animals.

For example, for cattle that is typically about 200 days, beginning at a starting weight of about 350±25 kg In one embodiment, the present disclosure, discloses a method of enhancing the Longissimus thoracic area (cm$^2$) of the animal by at least 2%, wherein the animal has been fed a feed additive composition comprising at least a portion of pea protein solubles, in particular pea solubles added to canola meal. The longissimus muscle is the largest muscle of the animal body and this long muscle runs next to each side of the backbone (Laflamme, 1972). Longissimus is thus the most frequently used reference muscle in meat quality studies. Approximately 22% of the total weight of a beef carcass is contained in the round cut, which is traditionally underused because it is the least tender muscle in the beef carcass (Kim, Lonergan, & Huff-Lonergan, 2010; Senaratne, Calkins, Mello Jr, Hinkle, & Pokharel, 2010).

In one embodiment, the present disclosure, discloses a method of increasing the highest marbling grade (slightly abundant) of the meat derived from the animal by at least 15% of the total derived meat, wherein the animal has been fed a feed additive composition comprising at least a portion of pea protein solubles, in particular pea solubles added to canola meal. In one embodiment, the present disclosure, discloses a method of increasing the marbling of the meat derived from the animal by least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%. In some preferred embodiments, the marbling of the meat derived from an animal is increased by at least 15% when the animal is fed the animal feed additive composition mixed with the animal feed for a typical growth period for commercial background and finishing of animals. For example, for cattle that is typically about 200 days, beginning at a starting weight of about 350±25 kg.

EXEMPLARY NON-LIMITING ASPECTS OF THE DISCLOSURE

Aspects, including embodiments, of the present subject matter described above may be beneficial alone or in combination, with one or more other aspects or embodiments. Without limiting the foregoing description, certain non-limiting aspects of the disclosure numbered 1-20 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

1. A method of enhancing meat quality obtained from an animal, the method comprising the steps of:
    adding an additive to the animal feed to make an improved animal feed;
    feeding the improved animal feed to the animal for at least a period of 200 days, and
    obtaining the meat from the animal, wherein quality of the obtained meat from the animal is enhanced compared to the quality of the obtained meat from an animal not fed the improved animal feed.

2. The method of aspect 1, wherein the additive comprises a portion of at least a portion of pea solubles.

3. The method of aspect 2, wherein the additive further comprises at least a portion of canola meal.

4. The method of aspect 3, wherein the portion of canola meal is at least 98.5% of canola meal and the portion of pea solubles is at least 1.5% pea protein soluble.

5. The method of any of aspects 1-4, wherein the quality of the obtained meat is measured by meat grading parameters.

6. The method of aspect 5, wherein the grading parameters are one or more of Longissimus thoracic area, proportion of prime quality meat, marbling of the meat, or a combination thereof.

7. The method of any of aspects 1-6, wherein the animal is a ruminating animal.

8 The method of aspect 7, wherein the ruminating animal is chosen from the group consisting of cattle, goats, sheep, giraffes, American Bison, European bison, yaks, water buffalo, deer, camels, alpacas, llamas, wildebeest, antelope, pronghorn, donkey, elephant and nilgai.

9. The method of aspect 7, wherein the ruminating animal is a cattle chosen from cows, bulls, heifers or steers.

10. The method of any of aspects 1-9, wherein the additive is added to the animal feed in an amount from 1 g to 50 g per kg of the total animal feed.

11. The method of any of aspects 1-4, wherein the meat quality is enhanced by increasing the Longissimus thoracic area (cm$^2$).

12. The method of any of aspects 1-4, wherein the meat quality is enhanced by increasing the slightly abundant marbling.

13. A method of increasing desired marbling of meat of a ruminant animal, the method comprising feeding the ruminant a feed comprising at least a portion of pea solubles.

14. The method of aspect 13, wherein the feed further comprises at least a portion of canola meal.

15. A method of increasing the Longissimus thoracic area of a ruminant animal, the method comprising feeding the ruminant a feed comprising at least a portion of pea solubles.

16. The method of aspect 15, wherein the feed further comprises at least a portion of canola meal.

17. A method of lowering grade fat thickness of a ruminant animal, the method comprising feeding the ruminant a feed comprising at least a portion of pea solubles.

18. The method of aspect 17, wherein the feed further comprises at least a portion of canola meal.

19. A method of increasing the proportion of prime quality of meat from a ruminant animal, the method comprising feeding the ruminant a feed comprising at least a portion of pea solubles.

20. The method of aspect 19, wherein the feed further comprises at least a portion of canola meal.

EXAMPLES

The following examples are put forth so as to provide those of ordinary skill in the art with a complete disclosure and description of how to make and use the present invention and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, temperature is in degrees Centigrade, and times are in minutes.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

Example 1A

Materials and Methods: Sixty-four crossbred beef steers with an average initial body weight (BW) of 350±25 kg (mean±SD) were purchased from commercial sources by the Beef Cattle Center of SIU and were contracted for this study. Steers were processed upon arrival and ear tagged. Steers were implanted with trenbolone acetate and estradiol-containing ear implants. Animals were cared for as per the overseeing animal care committee guidelines. The experiment was designed as a completely randomized design with four treatments. Steers were stratified by weight and were randomly assigned to one of 16 group feeding pens (4 steers per pen). Each pen was randomly assigned to one of the four treatments (4 pens per treatment).

Four dietary treatments were formulated for the 201-d growth performance study consisting of 56 d backgrounding and 145 d finishing phases. The composition of the total mixed ration is provided in Table 1. Steers were fed once daily for ad libitum intake, targeting a 5% feed refusal. Diets were formulated to a minimum of 12.5% crude protein (CP) and average daily gain (ADG) of 1.2 kg/day. At the end of the growing period (~400 kg), steers were transitioned to a finishing diet. The composition of finishing diets is provided in Table 1. There was a 15-d, five-step diet transition where the diet composition changed every 3 days in such a way that the level of corn grain in the diet increased while levels of forage decreased to the formulated levels in finishing diets. Concentrations of canola meal (CM), CM plus pea solubles (CM+PMS) and supplements remained the same. Finishing diets were formulated to a minimum of 12.0% CP and ADG of 1.5 kg/d. At the end of finishing, steers were shipped as a single group to a commercial slaughterhouse.

TABLE 1

| dietary composition of backgrounding and finishing steers | | | | |
|---|---|---|---|---|
| | Treatments - Backgrounding | | Treatments - Finishing | |
| Item, % DM basis | CM | CM + PMS | CM | CM + PMS |
| Grass Hay | 60.5 | 60.5 | 9 | 9 |
| Corn grain | 25.5 | 25.4 | 77 | 77 |
| CM | 10 | 9.86 | 10 | 9.86 |
| PMS | — | 0.15 | — | 0.14 |
| Supplement | 4 | 4 | 4 | 4 |

Steers were fed once daily, starting at 0800, using a feed mixer equipped with a digital scale. Bunks were read daily before feeding for the daily allotment of feed based on the amount of orts in the bunk and the amount fed the previous day. Every two weeks, bunks were cleaned, orts weighed and subsampled, and the remainder discarded. Steers were weighed on consecutive days at the beginning and end of the growing period and every 2 week in between. Samples of concentrate and total mix ration (TMR) were collected every 2 week, while forage samples were collected every week. Dry matter of orts was used to correct the dry matter intake (DMI). Feed and TMR samples were composited monthly and saved for later analysis.

Results

The growth performance of beef cattle fed CM and CM+PMS did not vary over 56 days of backgrounding and 145 days of finishing, or the entire 201 days of the study.

Carcass characteristics are presented in Table 2, using USDA standard measurements.

TABLE 2

Effect of inclusion of food industry by-products in finishing diets on carcass characteristics of feedlot cattle Treatments 1

| Item | CM | CM + PMS | SEM2 | P-value |
|---|---|---|---|---|
| Hot carcass weight (kg) | 374.1 | 372.9 | 15.03 | 1.00 |
| Dressing percentage (%) | 58.7 | 59.4 | 0.54 | 0.60 |
| L. thoracis area (cm2) | 80.1 | 81.1 | 1.67 | 0.31 |
| Grade fat (cm) | 1.59 | 1.57 | 0.116 | 0.83 |
| Yield grade (%) | | | | |
| YG 1 | 0.0 | 0.0 | — | — |
| YG 2 | 18.8 | 13.3 | 4.91 | 0.86 |
| YG 3 | 50.0 | 60.0 | 6.27 | 0.65 |
| YG 4 | 31.2 | 26.7 | 5.48 | 0.47 |
| YG 5 | 0.0 | 0.0 | — | 0.43 |
| Quality grade (%) | | | | |
| Prime | 6.3 | 20.0 | 3.87 | 0.53 |
| Choice | 87.5 | 66.7 | 4.87 | 0.57 |
| Select | 6.3 | 13.3 | 3.54 | 0.87 |
| Marbling (%) | | | | |
| Slightly abundant | 6.3 | 20.0 | 3.87 | 0.53 |
| Moderate | 25.0 | 26.7 | 5.51 | 0.80 |
| Modest | 37.5 | 13.3 | 4.93 | 0.29 |
| Small | 12.5 | 26.7 | 5.44 | 0.34 |
| Slight | 18.8 | 13.3 | 4.17 | 0.79 |
| Kidney, pelvic, and heart fat (KPH) | | | | |
| 1.50% | 31.2 | 33.3 | 5.98 | 0.97 |
| 2% | 62.5 | 60.0 | 6.19 | 0.98 |
| 2.50% | 6.3 | 6.7 | 1.530 | 0.79 |

Though not statistically significant for this group, the percentage of prime quality meat and slightly abundant marbling were around 15% of the total meat higher in steers fed 10% canola meal plus 1.5% pea solubles in comparison with steers fed 10% canola meal with no pea solubles added.

What is claimed is:

1. A method of enhancing meat quality obtained from an animal, the method comprising the steps of:

adding an additive to the animal feed to make an improved animal feed, wherein said additive consists of 98.5% canola meal (db, w/w) and 1.5% pea solubles (db, w/w);

feeding the improved animal feed to the animal for at least a period of 200 days, and obtaining the meat from the animal, wherein:

the meat quality is based one or more of Longissimus thoracic area, proportion of prime quality meat, and marbling of the meat, the quality of the obtained meat from the animal is enhanced compared to the quality of the obtained meat from an animal not fed the improved animal feed, and the pea solubles are obtained by a method consisting of:

a. treating milled pea flour under alkaline conditions to solubilize a protein fraction;

b. separating the protein fraction from a starch rich pellet using a solid-liquid separation method;

c. precipitating the protein from the protein fraction by isoelectric precipitation to generate a protein-rich pellet;

d. separating the protein rich pellet from the protein fraction to obtain pea solubles (<5% solids); and e. concentrating the pea solubles by filtration or evaporation to a minimum solid content of 45%, weight to volume (w/v).

2. The method of claim 1, wherein the animal is a ruminating animal.

3. The method of claim 2, wherein the ruminating animal is chosen from the group consisting of cattle, goats, sheep, giraffes, American Bison, European bison, yaks, water buffalo, deer, camels, alpacas, llamas, wildebeest, antelope, pronghorn, donkey, elephant and nilgai.

4. The method of claim 2, wherein the ruminating animal is a cattle chosen from cows, bulls, heifers or steers.

5. The method of claim 1, wherein the additive is added to the animal feed in an amount from 1 g to 50 g per kg of the total animal feed.

6. The method of claim 1, wherein the meat quality is enhanced by increasing the Longissimus thoracic area ($cm^2$).

7. The method of claim 1, wherein the meat quality is enhanced by increasing the slightly abundant marbling.

8. A method of increasing desired marbling of meat of a ruminant animal, the method comprising feeding the ruminant a feed comprising 98.5% canola meal (db, w/w) and 1.5% pea solubles (db, w/w), wherein the pea solubles are obtained by a method consisting of:

a. treating milled pea flour under alkaline conditions to solubilize a protein fraction;

b. separating the protein fraction from a starch rich pellet using a solid-liquid separation method;

c. precipitating the protein from the protein fraction by isoelectric precipitation to generate a protein-rich pellet;

d. separating the protein rich pellet from the protein fraction to obtain pea solubles (<5% solids); and e. concentrating the pea solubles by filtration or evaporation to a minimum solid content of 45%, weight to volume (w/v).

9. A method of lowering grade fat thickness of a ruminant animal, the method comprising feeding the ruminant a feed comprising 98.5% canola meal (db, w/w) and 1.5% pea solubles (db, w/w), wherein the pea solubles are obtained by a method consisting of:

a. treating milled pea flour under alkaline conditions to solubilize a protein fraction;

b. separating the protein fraction from a starch rich pellet using a solid-liquid separation method;

c. precipitating the protein from the protein fraction by isoelectric precipitation to generate a protein-rich pellet;

d. separating the protein rich pellet from the protein fraction to obtain pea solubles (<5% solids); and e. concentrating the pea solubles by filtration or evaporation to a minimum solid content of 45%, weight to volume (w/v).

10. A method of increasing the proportion of prime quality of meat from a ruminant animal, the method comprising feeding the ruminant a feed comprising 98.5% canola meal (db, w/w) and 1.5% pea solubles (db, w/w), wherein the pea solubles are obtained by a method consisting of:

a. treating milled pea flour under alkaline conditions to solubilize a protein fraction;

b. separating the protein fraction from a starch rich pellet using a solid-liquid separation method;

c. precipitating the protein from the protein fraction by isoelectric precipitation to generate a protein-rich pellet;

d. separating the protein rich pellet from the protein fraction to obtain pea solubles (<5% solids); and e. concentrating the pea solubles by filtration or evaporation to a minimum solid content of 45%, weight to volume (w/v).

\* \* \* \* \*